US008312000B1

(12) United States Patent
Burger et al.

(10) Patent No.: US 8,312,000 B1
(45) Date of Patent: Nov. 13, 2012

(54) GENERATING AN INTEGRATED EXECUTION PLAN FOR MULTIPLE DATABASE REQUESTS

(75) Inventors: Louis M. Burger, Escondido, CA (US); Thomas P. Julien, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 73 days.

(21) Appl. No.: 12/908,052

(22) Filed: Oct. 20, 2010

(51) Int. Cl.
*G06F 17/30* (2006.01)

(52) U.S. Cl. ...................................................... 707/706

(58) Field of Classification Search .............. 707/2, 716, 707/706; 709/223
See application file for complete search history.

(56) References Cited

U.S. PATENT DOCUMENTS

| | | | |
|---|---|---|---|
| 5,473,773 A | 12/1995 | Aman | |
| 5,537,542 A | 7/1996 | Eilert | |
| 5,675,797 A | 10/1997 | Chung | |
| 6,052,694 A | 4/2000 | Bromberg | |
| 6,718,358 B1 | 4/2004 | Bigus | |
| 6,950,848 B1 | 9/2005 | Yousefi'zadeh | |
| 7,146,353 B2 | 12/2006 | Garg | |
| 7,228,546 B1 | 6/2007 | McCarthy | |
| 7,395,537 B1 | 7/2008 | Brown | |
| 7,693,820 B2 * | 4/2010 | Larson et al. | 707/999.002 |
| 2003/0002649 A1 | 1/2003 | Hettish | |
| 2003/0005028 A1 | 1/2003 | Dritschler | |
| 2003/0233391 A1 | 12/2003 | Crawford, Jr. | |
| 2004/0021678 A1 | 2/2004 | Ullah | |
| 2004/0225631 A1 | 11/2004 | Elnaffar | |
| 2004/0236757 A1 | 11/2004 | Caccavale | |
| 2004/0243692 A1 | 12/2004 | Arnold | |
| 2005/0038789 A1 | 2/2005 | Chidambaran | |
| 2005/0038833 A1 | 2/2005 | Colrain | |
| 2005/0039183 A1 | 2/2005 | Romero | |
| 2005/0066326 A1 | 3/2005 | Herbeck | |
| 2005/0125213 A1 | 6/2005 | Chen | |
| 2005/0262183 A1 | 11/2005 | Colrain | |
| 2006/0026179 A1 | 2/2006 | Brown | |
| 2007/0162426 A1 | 7/2007 | Brown | |
| 2008/0162417 A1 | 7/2008 | Morris | |
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1 | 7/2008 | Richards | |

OTHER PUBLICATIONS

Beyer et al., "Protecting the Quality of Service of Existing Information Systems", Computer Sciences Department, University of Wisconsin, 2003, pp. 1-10.
Nikolaou et al., "Transaction Routing for Distributed OLTP Systems: Survey and Recent Results", Department of Computer Science, University of Crete and Institute of Computer Science, 2002, pp. 1-26.
Sinnwell et al., "Managing Distributed Memory to Meet Multiclass Workload Response Time Goals", Department of Computer Science, University of the Saarland, 2002, pp. 1-8.

(Continued)

*Primary Examiner* — Etienne LeRoux
(74) *Attorney, Agent, or Firm* — Trop, Pruner & Hu P.C.

(57) ABSTRACT

For a given pool of database requests, a database system generates an integrated execution plan for multiple ones of the database requests in the pool. The database system determines whether to execute the integrated execution plan or individual execution plans corresponding to the respective multiple database queries. The determining is based on one or more criteria including performance goals corresponding to the respective multiple database requests.

20 Claims, 3 Drawing Sheets

OTHER PUBLICATIONS

Oracle, "ORACLE91 Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

U.S. Appl. No. 12/317,836 entitled "Database System Having a Service Level Goal Responsive Regulator" filed Dec. 30, 2008 (24 pages).

U.S. Appl. No. 12/317,985 entitled "Database System Having Regulator That Performs Workload Regulation Based on Optimizer Estimates" filed Dec. 30, 2008 (26 pages).

U.S. Appl. No. 12/482,780 entitled "Database System Having a Regulator to Provide Feedback Statistics to an Optimizer" filed Jun. 11, 2009 (33 pages).

* cited by examiner

GENERATING AN INTEGRATED EXECUTION PLAN FOR MULTIPLE DATABASE REQUESTS

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In a relatively large database system, there can be a relatively large number of concurrently submitted database queries that are to be processed by the database system to produce results. When processing large numbers of queries, the resources of the database system can experience heavy workloads. If the workloads are not efficiently handled, then users of the database system may experience delays in obtaining results for queries.

SUMMARY

In general, according to some embodiments, for a given pool of database requests, a database system generates an integrated execution plan for multiple ones of the database requests in the pool. The database system determines whether to execute the integrated execution plan or individual execution plans corresponding to the respective multiple database queries. The determining is based on one or more criteria including performance goals corresponding to the respective multiple database requests.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
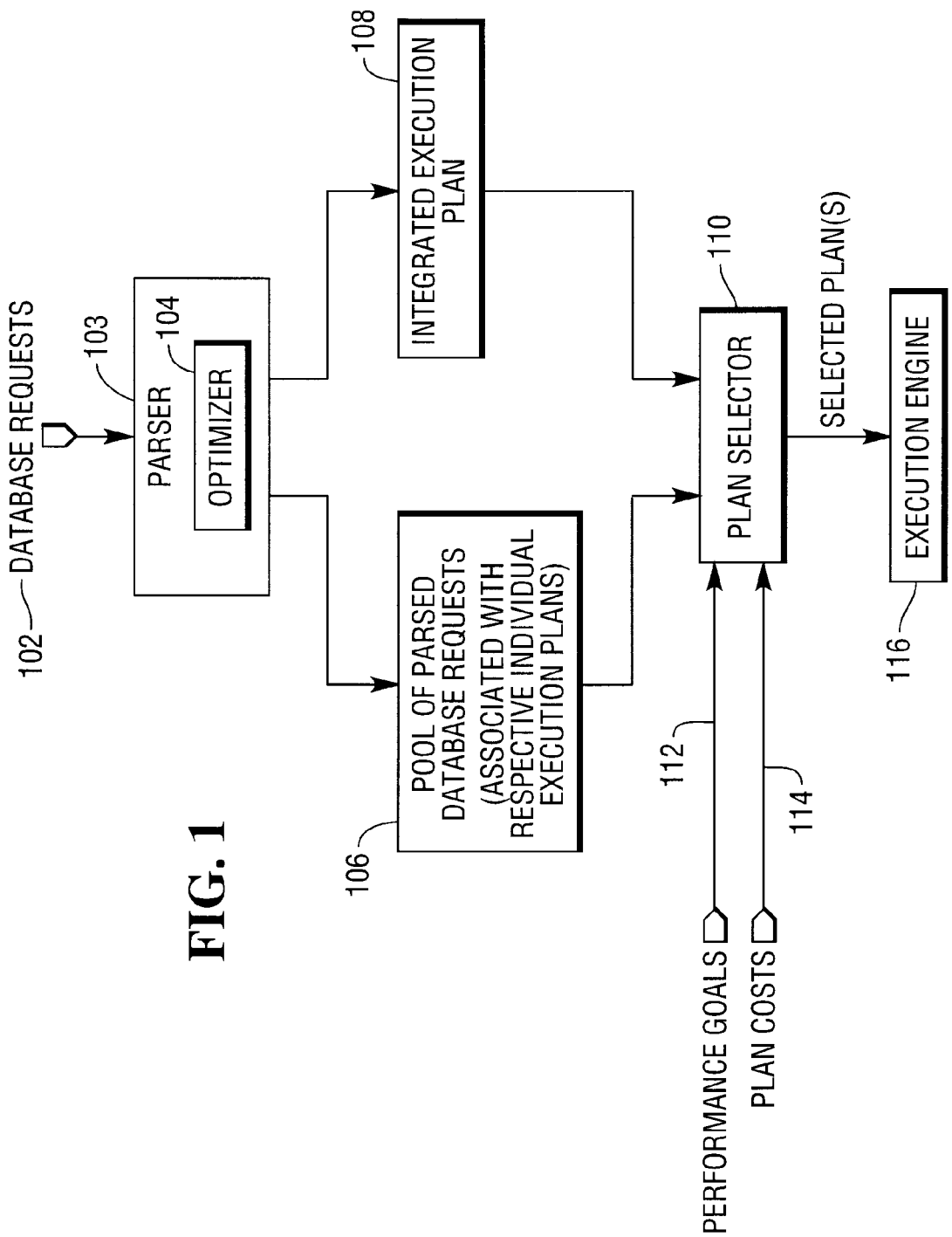
FIG. 1 is a block diagram of components in a database system according to some embodiments.

FIG. 1 is a block diagram of various components in a database system according to an example arrangement. Database requests (102) are received by a parser 103, which parses each received database request into a form for use by an optimizer 104 in the parser 103. The term "request" refers to a database query (e.g., Structured Query Language or SQL query) that is processed by the database system to produce an output result. Alternatively, a "request" can refer to a utility, such as a load utility to perform loading of data from a source to a target. Note that a database request can include a multi-statement query that has multiple database queries.

For each database request, the optimizer outputs a respective execution plan, which typically includes steps that are to be executed to produce a result for the request. Examples of steps of an execution plan include sort steps, merge steps, data distribution steps (to distribute data among multiple processing modules or computer nodes, for example), and other types of steps.

For a given database request, the optimizer 104 is able to generate multiple candidate execution plans, with the optimizer 104 selecting from among the most efficient of the candidate execution plans to provide as the execution plan to use for processing the respective database request. The selected execution plan for a given database request is referred to as an individual execution plan for the database request. For plural database requests, there are plural respective individual execution plans produced by the optimizer 104.

The parser 103 outputs parsed database requests along with respective execution plans. The output parsed database requests can be temporarily stored as a pool 106 of parsed database requests. The pool 106 of parsed database requests is considered to include requests waiting to be executed.

In accordance with some embodiments, the optimizer 104 is also able to produce an integrated execution plan 108 corresponding to multiple ones of the parsed database requests that are in the pool 106. The integrated execution plan 108 provides for resource sharing by the multiple database requests in the pool 106. In some examples, processing of the database request can involve production of intermediate results that are used in generating the final result for the database request. These intermediate results can be stored in intermediate tables (also referred to as spools, which are temporary tables). The intermediate results, and/or steps used to produce the intermediate results, can be shared by multiple requests in the integrated execution plan 108.

In some implementations, the algorithm used to generate the integrated execution plan 108 is based on the algorithm used for generating an intergrated plan for multi-statement requests, except with the following enhancements: (1) each individual request's final response step remains independent and immediately returns its final result upon completion, and (2) the optimizer provides an estimated response time for each individual request in the plan in addition to the cumulative cost of the integrated plan.

An integrated execution plan includes various steps that are to be processed for the pool 106 of database requests. As noted, in some implementations, the final step of each database request remains independent in the integrated execution plan—once a final step for the respective database request executes, the final results of the final step for the respective database request can be output immediately. Final results are output "immediately" if the results are output during execution of the respective final step without having to wait for a step of another request associated with the integrated execution plan to complete.

In the ensuing discussion, it is assumed that the integrated execution plan 108 is for all of the database requests in the pool 106. In alternative examples, it is possible that the integrated execution plan 108 is for just a subset (less than all) of the database requests in the pool 106. Note that there can be multiple pools of database requests (output by the parser 103) that are associated with respective integrated execution plans.

In processing database requests, execution steps are performed to populate the intermediate results. For example, a database request can involve sorting of data in respective base tables, followed by merging of the sorted data. The sort step can be performed first, followed by the merge step. The sorted data can be stored in intermediate tables, with the merge operation applied on the content of the intermediate tables containing the sorted data. Multiple database requests can involve the same sorting operations that produce sorted data in the intermediate tables. For enhanced efficiency, instead of separately performing the same sorting operations for each of the multiple database requests, the multiple database requests can instead share the same sorting operation(s) and the same intermediate table(s) in the integrated execution plan 108. In other words, by executing the integrated execution plan 108 instead of the individual execution plans, enhanced resource usage efficiency can be achieved since intermediate results and/or execution steps for populating intermediate results can be shared by multiple requests, which reduces the burden on storage and/or processing resources of the database system.

A challenge posed by performing inter-request optimization (in which an integrated execution plan is produced that allows for sharing of resources, including common intermediate results and/or associated execution steps that populate the common intermediate results) is that response times of individual ones of the multiple database requests that are associated with the integrated execution plan 108 can suffer. When execution steps for separate database requests are combined, it is possible that a given one of the database requests is slowed down while the given database request waits for shared dependent steps (shared with other database requests) to complete. The increased response time for the delayed database request can cause a performance goal of the delayed database request to be exceeded, which is undesirable.

In accordance with some embodiments, as depicted in FIG. 1, a plan selector 110 is able to decide whether to use the integrated execution plan 108 or the individual execution plans of the multiple database requests in the pool 106. The plan selector 110 receives as inputs performance goals (112) of respective database requests in the pool 106, as well as costs (114) associated with the integrated execution plan 108 and the individual execution plans of the multiple database requests in the pool 106. A performance goal (also referred to as a "service level goal" or SLG) refers to a predefined set of one or more performance criteria that are to be satisfied during execution of a corresponding request. The performance goal or SLG can be defined by a database administrator, for example. In some examples, a performance goal can be any one or more of the following: a target response time; a target service level; and so forth. In a more specific example, the performance goal for a request can be "≦1 second @ 95," which means that such request should execute within 1 second 95% of the time. Another example performance goal can be "1000 queries per hour."

In some embodiments, the plan selector 110 selects between execution of the integrated execution plan 108 or the individual execution plans in the pool 106 based on one or multiple selection criteria, including: (1) comparing relative costs; and (2) determining whether performance goals of any database request will be violated by executing the integrated execution plan 108 rather than the individual execution plans.

For selection criterion (1) above, the plan selector 110 compares an estimated cost of the integrated execution plan 108 with a cumulative estimated cost of the individual execution plans of the multiple database request that have been combined to form the integrated execution plan 108. The cost for the integrated execution plan 108 and the costs for the individual execution plans are generated by the optimizer 104 as part of the optimization algorithm employed by the optimizer 104. The cumulative estimated cost of the multiple database requests can be some aggregate (e.g., sum, average, median, etc.) of the individual estimated costs of the multiple database requests. In some examples, cost can be defined as the amount of time and/or system resources (e.g., processor resources, storage resources, input/output or I/O resources, network resources, etc.) employed to perform an execution plan.

The compared costs of the integrated execution plan and the individual execution plans can be expressed in terms of time. In determining the estimated time for the integrated execution plan, the optimizer can predict the amount of time each step of the integrated execution plan will take, based on the number of operations (e.g., I/O operations) expected to be performed by each step. The number of operations is multiplied by a time factor to compute the time for each step of the integrated execution plan, up until the final step of the integrated execution plan. In some implementations, note that in the integrated execution plan, the final step for each of the requests associated with the integrated execution plan are maintained separate so that the results of each final step is made available upon execution of the final step.

In some implementations, the plan selector 110 uses the integrated execution plan 108 in response to determining that the estimated cost of the integrated executed plan 108 is less than the cumulative estimated cost of the multiple individual execution plans. In more specific examples, the plan selector 110 selects the integrated execution plan 108 to execute rather than the multiple individual execution plans in response to determining that the estimated cost of the integrated execution plan 108 is less than the cumulative estimated cost of the individual execution plans by greater than some predefined threshold (e.g., the estimated cost of the integrated execution plan 108 is less than the cumulative estimated cost of the individual execution plans by greater than some predefined percentage). If the estimated cost of the integrated execution plan 108 is not greater than the cumulative estimated cost of the individual execution plans (by greater than some predefined threshold), then the plan selector 110 selects the individual execution plans for execution rather than the integrated execution plan 108.

The plan selector 110 also considers performance goals of the database requests in determining whether or not to use the integrated execution plan 108 (selection criterion (2) above). If the integrated execution plan 108 would cause a performance goal of any of the database requests to be violated, then the plan selector 110 would decline to use the integrated execution plan 108, but instead, would use the individual execution plans. In some implementations, consideration of selection criterion (2) is performed only in response to determining that the estimated cost of the integrated execution plan is less than the cumulative estimated costs of the individual execution plans by greater than the predefined threshold.

The selected execution plan(s) (integrated execution plan 108 or individual execution plans) for the database requests of the pool 106 is (are) output to an execution engine 116 of the database system for execution of the selected execution plan(s).

Figure 2:
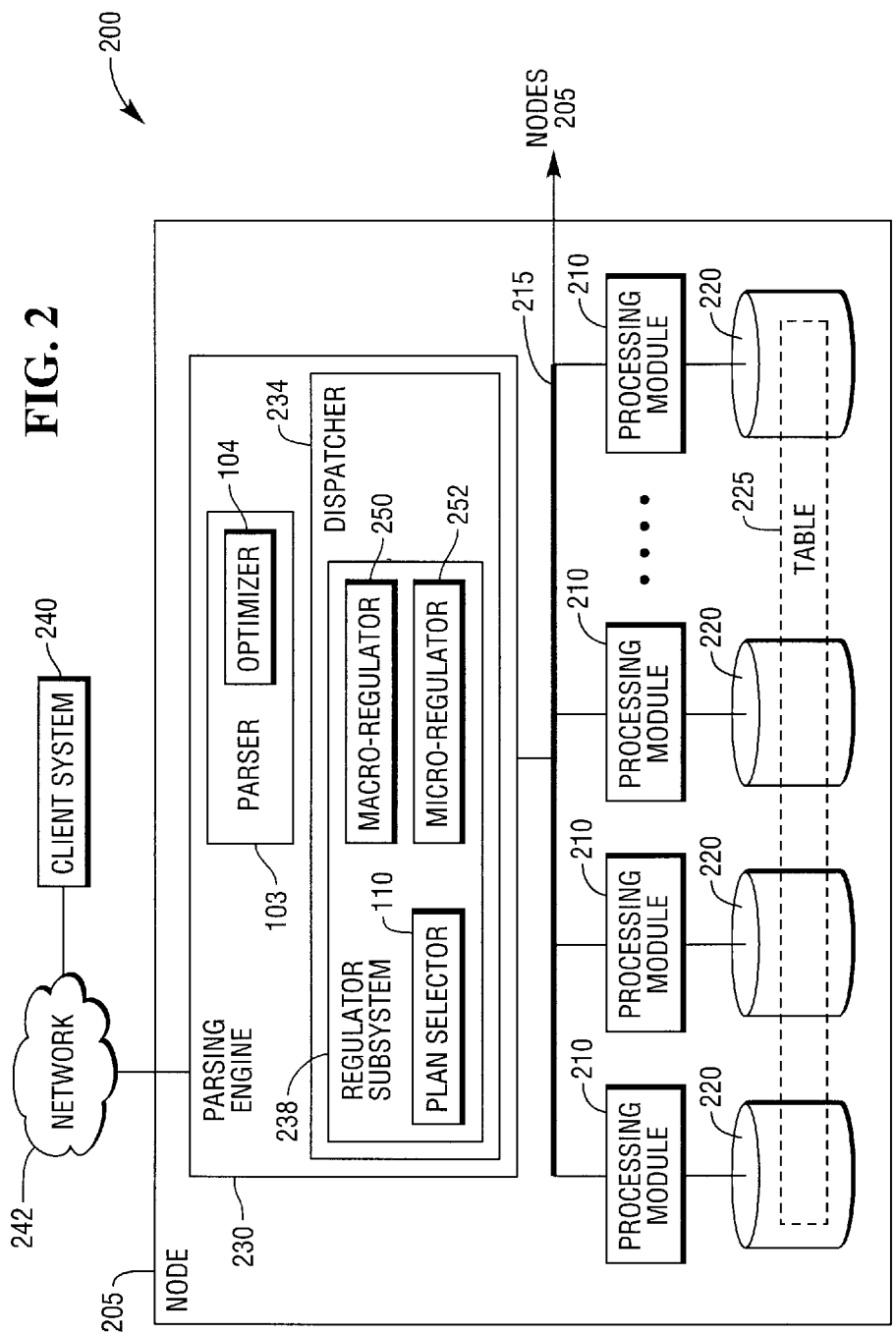
FIG. 2 is a block diagram of an example database system that is capable of incorporating some embodiments.

FIG. 2 illustrates an exemplary database system 200 in which some embodiments of the invention can be incorporated. The database system 200 can include multiple nodes 205 (just one node depicted in FIG. 2). Each node 205 includes one or more processing modules 210 connected to a network 215. The processing modules 200 manage the storage and retrieval of data in respective data-storage facilities 220. Each of the processing modules 210 may be one or more physical processors or may be a virtual processor, with one or more virtual processors running on one or more physical processors.

Each processing module 210 manages a portion of a database that is stored in a corresponding one of the data-storage facilities 220. Each data-storage facility 220 includes one or more disk drives or other types of storage devices. The nodes 205 of the database system are interconnected by the network 215.

As depicted in FIG. 2, a table 225 is distributed across the data-storage facilities 220, where different rows of the table 225 can be distributed across the data-storage facilities. In response to a request, one or more of the processing modules 210 can be instructed to retrieve corresponding rows from the table 225 to provide a result to the querying client (which can be one of the client systems 240).

The node 205 also includes a parsing engine 230, which has the parser 103 and a dispatcher 234. The parser 103 receives database requests (such as those submitted by client systems 240 over a network 242). As discussed above, the parser 103 includes the optimizer 104 that generates execution plans in response to requests.

The dispatcher 234 sends the executable steps of the each execution plan generated by the parser 103 to one or multiple processing modules 210 in the node 205. The processing modules 210 are part of the execution engine 116 depicted in FIG. 1. The processing module(s) 210 execute(s) the steps of each the execution plan. If the request specifies retrieval of data from the table 225, then the retrieved data is sent back by the database system 200 to the querying client system 240 for storage or display at the client system 240 (which can be a computer, personal digital assistant, etc.). A request can alternatively specify writes of data to storage.

In some implementations, the dispatcher 234 includes a regulator subsystem 238. Note that parts of the regulator subsystem 238 can also be in the processing modules 210 (not depicted), since the regulator subsystem 238 according to some examples are able to monitor execution of requests to determine progress of execution of requests. The regulator subsystem 138 has a macro-regulator 150 and a micro-regulator 152. As further depicted in FIG. 2, the regulator subsystem 138 also includes the plan selector 110 discussed above in connection with FIG. 1.

Although not shown, the node 205 of FIG. 2 can include storage (e.g., temporary storage such as random access memory or persistent storage such as disk-based storage or other storage) to store pool(s) 106 of database requests as discussed above in connection with FIG. 1. The pool(s) 106 of database requests can be stored in a scheduling queue of a scheduler (not shown) in the dispatcher 234, or in a delay queue of the regulator subsystem 238 (where the delay queue is used to temporarily hold requests whose execution is to be delayed according to various criteria). In other examples, the pool(s) 106 of database requests can be stored in other storage structures.

In some implementations, the macro-regulator 252 performs macro-regulation, where the macro-regulator 252 determines whether or not an incoming request is to be immediately scheduled for execution or whether the incoming request should be held (delayed) for later execution. For example, database requests can be divided into multiple workload groups, where each workload group is a set of requests that have common characteristics, such as an application that issued the requests, a source of the requests, type of query, performance goals, priority, response time goals, throughput, and so forth. As part of the macro-regulation, the macro-regulator 252 can consider concurrency levels (number of concurrent executing requests from each workload group) of the workload groups. The macro-regulator 252 monitors the concurrency levels of the workload groups, and if the concurrency level of a corresponding workload group (that an incoming request is assigned to) is above a predefined threshold (which means that there are too many concurrent executing requests for this workload group), then the incoming request for that workload group waits in a delay queue for later execution until the concurrency level for this workload group subsides below the defined threshold.

In addition, the macro-regulator 252 can also, prior to execution of an incoming request, determine whether it would not be possible to satisfy the performance goal of the request. This can be determined based on resource estimates (e.g., time estimates, processor usage estimates, storage usage estimates, I/O usage estimates, etc.) provided by the optimizer 104 to the macro-regulator 252. The macro-regulator 252 can determine if, given the resource estimates from the optimizer 104 for the incoming request, that the performance goal of the request cannot be satisfied. If this is the case, the request can be rejected or delayed.

If an incoming request can be scheduled for immediate execution, the macro-regulator 252 places the incoming request into one of multiple workload group buckets, which are execution queues of the regulator subsystem 238 that contain requests scheduled for execution.

After macro-regulation performed by the macro-regulator 252, the micro-regulator 250 can perform performance goal-responsive micro-regulation for each request scheduled for execution. The micro-regulator 250 selects a request from one of the buckets of the regulator subsystem 238, according to predefined criteria, and executes the selected request. The micro-regulator 250 is able to adjust priority levels of requests during executions of the requests, based on monitoring progress of request execution and determining whether or not the performance goals of the requests can be met. Further details regarding the regulator subsystem 238 are disclosed in U.S. patent application Ser. No. 12/317,836, entitled "Database System Having a Service Level Goad Responsive Regulator," filed Dec. 30, 2008; and U.S. patent application Ser. No. 12/317,985, entitled, "Database System Having a Regulator That Performs Workload Regulation Based on Optimizer Estimates," filed Dec. 30, 2008.

In other implementations, the regulator subsystem 238 can be omitted.

Figure 3:
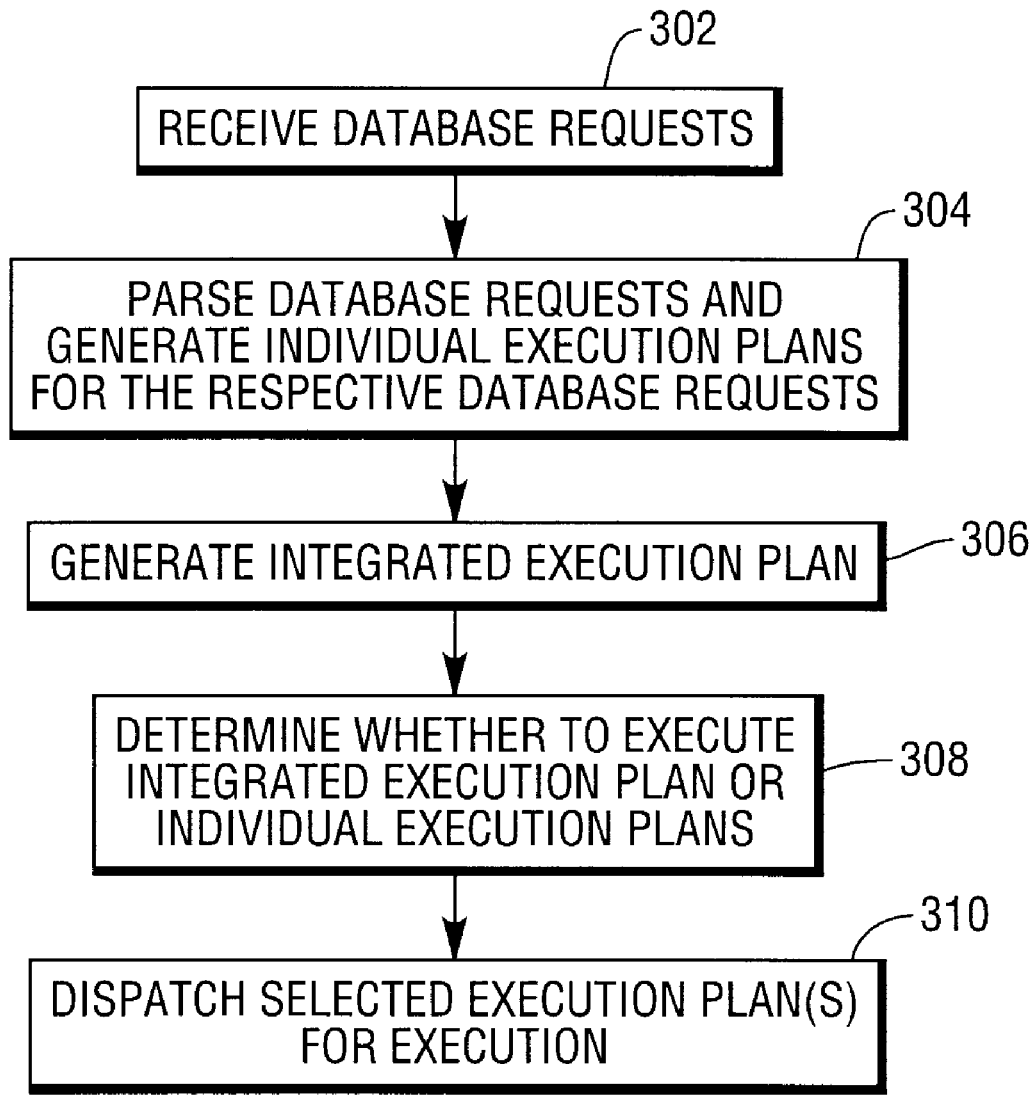
FIG. 3 is a flow diagram of a process of processing a pool of database requests, according to some embodiments.

FIG. 3 is a flow diagram of a process according to some embodiments. The process can be performed by one or more of the components depicted in FIG. 1 or 2. The process receives (at 302) database requests, such as those submitted by client systems 240 in FIG. 2 or by other requestors. The received database requests are parsed and individual execution plans are generated (at 304) for the respective database requests.

In addition, for a pool or other collection of database requests, an integrated execution plan (e.g., 108 in FIG. 1) is generated (at 306, such as by the optimizer 104 of FIG. 1 or 2).

Next, the process determines (at 308) whether to execute the integrated execution plan or individual execution plans corresponding to the database requests, based on one or multiple criteria, e.g., (1) comparison of the estimated cost of the integrated execution plan and cumulative estimated cost of the individual plans, and/or (2) determination of whether a performance goal of any of the database requests would be violated by executing the integrated execution plan rather than the individual execution plans. Note that the performance goal of a particular database request can be the performance goal of the workload group that the particular database request is part of.

The process then dispatches (at 310) the selected execution plan(s) to the execution engine 116 (FIG. 1) or processing module(s) 210 (FIG. 2) for execution.

By using techniques or mechanisms according to some embodiments, overall database system performance can be improved by sharing resources of the database system, without impacting the required performance goals of individual requests.

Machine-readable instructions described above (including the parser 103, optimizer 104, plan selector 110, and other modules of FIG. 1 or 2) are loaded for execution on a processor (such as any of the processing modules 210 of FIG. 2 that are implemented as physical processors, or other physical processors). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs).

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
for a given pool of database requests, generating, by a database system having a processor, an integrated execution plan for multiple ones of the database requests in the pool;
determining, by the database system, whether to execute the integrated execution plan or individual execution plans corresponding to the respective multiple database requests, wherein the determining is based on one or more criteria including performance goals corresponding to the respective multiple database requests; and
choosing, by the database system, to execute the integrated execution plan instead of the individual execution plans in response to determining that each of the performance goals of the respective multiple database requests will be satisfied by execution of the integrated execution plan.

2. The method of claim 1, further comprising:
choosing, by the database system, to execute the individual execution plans instead of the integrated execution plan in response to determining that the performance goals of the respective multiple database requests cannot be satisfied by execution of the integrated execution plan.

3. The method of claim 1, wherein a particular one of the multiple database requests is part of a set of requests, and wherein the performance goal corresponding to the particular database request is a performance goal of the set of requests.

4. The method of claim 1, wherein at least one of the database requests is a multi-statement database query.

5. The method of claim 1, wherein each of the performance goals specifies one or more performance criteria to be satisfied by the corresponding database request during execution of the corresponding database request.

6. The method of claim 1, wherein generating the integrated execution plan comprises generating a plan in which the multiple database requests share a resource of the database system.

7. The method of claim 6, wherein sharing the resource includes one or more of sharing an execution step, and sharing intermediate results.

8. The method of claim 1, wherein the integrated execution includes a shared execution step for plural ones of the multiple database requests, and individual steps for respective ones of the multiple database requests.

9. A method comprising:
for a given pool of database requests, generating, by a database system having a processor, an integrated execution plan for multiple ones of the database requests in the pool; and
determining, by the database system, whether to execute the integrated execution plan or individual execution plans corresponding to the respective multiple database requests, wherein the determining is based on one or more criteria including performance goals corresponding to the respective multiple database requests, wherein the one or more criteria further includes a condition specifying that the integrated execution plan is to be executed instead of the individual execution plans if a cost of the integrated execution plan is less than a cumulative cost of the individual execution plans.

10. The method of claim 9, wherein the condition specifies that the integrated execution plan is to be executed instead of the individual execution plans if the cost of the integrated execution plan is less than the cumulative cost of the individual execution plans by greater than a predefined threshold.

11. An article comprising at least one machine-readable storage medium storing instructions that upon execution by a database system having a processor cause the database system to:
receive requests to access data stored by the database system;
generate individual execution plans for the requests;
generate an integrated execution plan for the requests, wherein the integrated execution plan specifies sharing of a resource of the database system by the requests;
select the integrated execution plan or the individual execution plans based on at least one criterion that includes a condition specifying that the integrated execution plan cannot be used if a performance goal of any of the requests cannot be satisfied by executing the integrated execution plan.

12. The article of claim 11, wherein the instructions upon execution cause the database system to further:
dispatch the selected execution plan(s) to an execution engine of the database system.

13. The article of claim 11, wherein the at least one criterion further specifies that the integrated execution plan is to be selected if an estimated cost of the integrated execution plan is less than a cumulative estimated cost of the individual execution plans.

14. The article of claim 13, wherein the cumulative estimated cost of the individual execution plans is based on an aggregate of estimated costs of the individual execution plans as provided by an optimizer of the database system.

15. The article of claim 11, wherein the integrated execution plan includes a plurality of steps that include independent final steps of the respective requests, wherein results of each of the final steps is made available immediately upon execution of the respective final step.

16. The article of claim 11, wherein the shared resource comprises a shared execution step.

17. A database system comprising:
 storage media to store data; and
 at least one processor configured to:
  for a given pool of database requests, generate an integrated execution plan for multiple ones of the database requests in the pool, wherein the integrated execution plan includes:
   a shared execution step for plural ones of the multiple database requests, and
   individual steps for respective ones of the multiple database requests; and
  determine whether to execute the integrated execution plan or individual execution plans corresponding to the respective multiple database requests, wherein the determining is based on one or more criteria including performance goals corresponding to the respective multiple database requests.

18. The database system of claim 17, further comprising:
 processing modules to execute steps of the integrated execution plan or the individual execution plans.

19. The database system of claim 17, wherein the one or more criteria include a condition specifying that the integrated execution plan is not to be selected if any of the performance goals of the multiple database requests will be violated due to execution of the integrated execution plan.

20. The database system of claim 19, wherein the one or more criteria include another condition specifying that the integrated execution plan is to be executed only if an estimated cost of the integrated execution plan is less than a cumulative estimated cost of the individual execution plans by greater than a predefined threshold.

* * * * *